Dec. 22, 1942.    F. H. LEAVITT    2,306,339
METHOD AND APPARATUS FOR PROTECTING SUB-SURFACE GROUND TOOLS
Filed Dec. 26, 1941
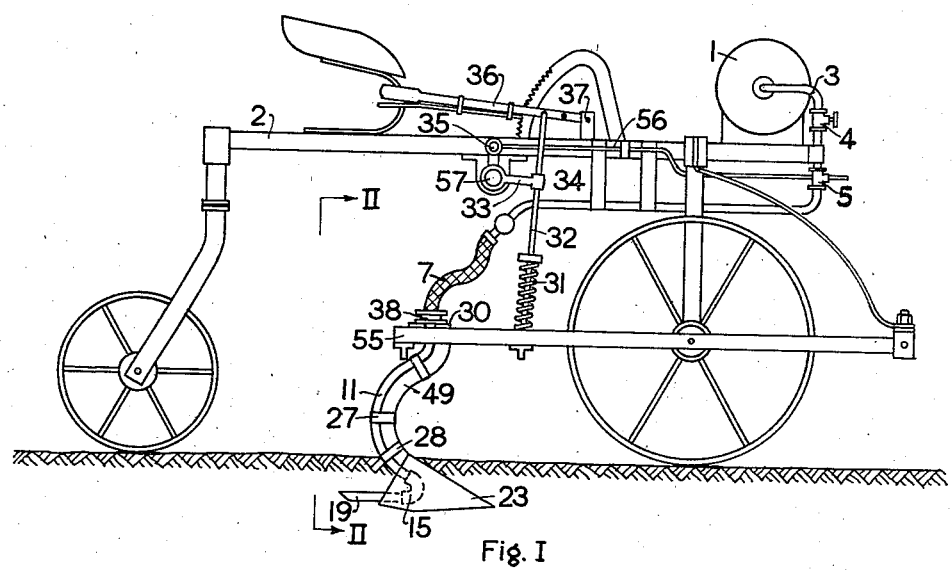
Fig. I
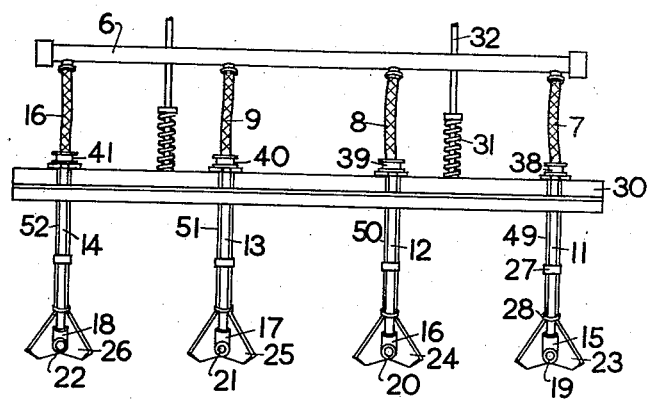
Fig. II
Fig. III
Fig. IV
Inventor: Floyd H. Leavitt
By His Attorney: H. Birch Patented Dec. 22, 1942

2,306,339

UNITED STATES PATENT OFFICE 2,306,339

METHOD AND APPARATUS FOR PROTECTING SUBSURFACE GROUND TOOLS

Floyd H. Leavitt, Burlingame, Calif., assignor to Shell Development Company, San Francisco, Calif., a corporation of Delaware Application December 26, 1941, Serial No. 424,506

11 Claims. (Cl. 111—6)

The present invention relates to a method and apparatus for protecting sub-surface ground working tools and the like from abrasion by the soils through which they are drawn.

It has long been recognized that the fertilizer element most frequently lacking in soils, and the one which must be supplied in the largest amounts, is nitrogen. Only a few species of plants are able to utilize the abundant nitrogen present in the earth's atmosphere; the remainder must obtain their supply of nitrogen from the soil.

Potassium, phosphorus and calcium compounds and numerous other necessary compounds are present in soils in insoluble form but are slowly made soluble by the action of air and water, and more particularly by the action of the plant roots. In this respect the supply of nitrogen differs radically from that of other elements utilized as plant food. When nitrogen is present in organic, insoluble compounds such as dried blood, tankage or manure, it must first be converted by bacterial action, independently of plant root action, into soluble nitrates which may be taken up by the plant roots. These soluble nitrogen compounds suitable for absorption by plant roots are, however, subject to dissipation by leaching and erosion because of their soluble nature.

In the past the necessary nitrogen has been supplied to soil by incorporating therein nitrates or ammonium salts. However, repeated application of ammonius salts, such as ammonium sulphate, at times have the undesirable effect of producing an acid condition in the soil, due to the acid radical contained in the salts. Similarly, an equally undesirable excessively alkaline condition may result from the extensive use of such nitrogen compounds as sodium nitrate.

A method of supplying a source of fixed nitrogen to the soil wherein the above difficulties are obviated and numerous other advantages attained is disclosed in. my Patent No. 2,285,932, dated June 9, 1942, of which the present application is a continuation-in-part. This method comprises, briefly, the direct addition of anhydrous ammonia to the soil in controlled amounts as a supply of fixed nitrogen.

As is also disclosed in the above mentioned copending application, a suitable method of applying anhydrous ammonia to the soil comprises injecting the same under the surface of the soil by means of a nozzle or the like which is carried on or trailed behind ground working equipment, such as a cultivator or the like. It has been found, however, that ammonia injector, unless made of a special tool steel, rapidly wears due to the abrasive action of the soil as it passes therethrough.

It is an object of the present invention to provide a method and apparatus whereby the abrasive effect of soil upon such equipment is obviated. Further, it is an object of the instant invention to provide a method and apparatus to negate the abrasive effect of sub-surface ground working tools by forming and maintaining a coating of ice thereon. Still further and more specifically, it is an object of this invention to provide a method and apparatus whereby an ice coating is formed on sub-surface ground working tools by expansion of a refrigerating fluid, such as ammonia, in proximity to the ground working tool.

Other objects, together with some of the advantages to be derived from utilizing the present invention, will become apparent from the following detailed description thereof, reference being had to the accompanying drawing, which constitutes a part of this specification, and wherein:

Figure I illustrates, in side elevation, a conventional cultivator modified according to the present invention; Figure II is a partial sectional elevation taken along the line II—II of Figure I; Figure III illustrates a modified form of the invention in side elevation as applied to a larger type of ground working tool; Figure IV is a plan view taken through IV—IV of Figure III.

In the following description the invention will be described with particular reference to the use of ammonia as a refrigerating fluid. It is, however, to be understood that other suitable refrigerants may also be utilized which do not have a deleterious action upon the soil, preferably those which have a beneficial effect thereon. Sulfur dioxide, hydrogen cyanide and similar fumigants which are occasionally used in soils for fungicidal or similar purposes may also be utilized according to the present invention. The principal criterion is that the material should have sufficient refrigerating properties for the purposes set forth below.

Referring to the drawing and particularly to Figures I and II, a cylinder 1 of refrigerating fluid under pressure, such as ammonia, is detachably mounted upon the frame 2 of a cultivator. A conduit 3 leads from the ammonia cylinder 1 through valves 4 and 5 and thence to a manifold 6. From manifold 6 a plurality of flexible conduits 7, 8, 9, 10 lead to arcuated metal conduits 11, 12, 13, 14 which are rigidly mounted on cultivator tool shanks 49, 50, 51, 52, being held firmly in place by brackets as at 27, 28. A series of expansion orifice unions 38, 39, 40, 41 are provided as connections between flexible conduits 7, 8, 9, 10 and arcuated conduits 11, 12, 13, 14. Injection nozzles, as at 19, 20, 21, 22 are connected to arcuate conduits 11, 12, 13, 14 respectively by means of flexible conduits 15, 16, 17, 18. Cultivator shovels 23, 24, 25, 26 partially enclose injection nozzles 19, 20, 21, 22 and flexible conduits 15, 16, 17, 18, respectively, as shown. Cultivator tool shanks 49, 50, 51, 52 are mounted on a gang-bar 30 in the well known manner.

The lifting lever arrangement for controlling the depth under the soil surface at which the cultivator shovels travel, consisting of lever 36 pivoted at 37, link 32 attached to lever 36 and spring 31 attached to pendant 55, is further provided with automatic means for controlling the flow of ammonia from cylinder 1 to manifold 6. An L-link 33 is attached pivotally to link 32 at 34 and similarly to a rod 56 which operates valve 5. L-link 33 is pivotally mounted on frame 2 at 57.

In operation, valve 4 is first opened and lever 36 then moved to the desired place and locked in position, preferably after forward movement of the machine has begun. As is apparent in the drawing, Figure I, the position at which lever 36 is locked in place will determine the depth at which the cultivator shovels and injectors travel beneath the soil surface. The downward movement of lever 36 also opens valve 5 and permits passage of ammonia to injection nozzles 19, 20, 21, 22 through manifold 6 and expansion orifice unions 38, 39, 40, 41. Any suitable type of expansion orifice may be used; those types in which various sizes of orifice discs may be inserted are preferable in order that the rate of flow to the injection nozzles may be varied, as in the case of ammonia injection the amount injected per acre should be varied in accordance with the particular crop growing or to be planted in the soil. The rate of flow, however, may be also controlled by valve 4, in which case a fixed orifice size may be utilized.

The expansion of the ammonia in passing through the expansion orifices results in the cooling of conduits 11, 12, 13, 14 and nozzles 19, 20, 21, 22 to a point whereat moisture in the air and in the soil condenses thereon and forms a protective coating of ice and/or frozen earth on the external surfaces thereof. As used in the present specification and claims the term "frozen protective sheathing" is intended to designate the ice, frozen earth or conglomerate mixture thereof formed on the external surfaces of a ground working tool under the conditions prescribed. Similarly, due to the heat conductive properties of metals, tool shanks 49, 50, 51, 52, which are in intimate contact with conduits 19, 20, 21, 22 respectively, become sufficiently chilled to cause moisture condensation and the formation of a frozen protective sheathing thereon. For the same reason, a frozen protective sheathing is also formed on each of the cultivator shovels.

In Figures III and IV a modification of the invention is shown for use with ground working tools which are too large to be sufficiently chilled by conduction for the maintenance of a frozen protective sheathing by the arrangement shown in Figures I and II. A plowshare 44 is rigidly attached to a supporting member 45. A flexible conduit 43 leading from a source of ammonia under pressure is connected to an arcuate conduit 46 by means of an expansion union 42, conduit 46 being shaped to follow the curvature of the inside face of the leading edge of the plowshare 44 and mounted in close contact therewith. A pair of conduits 47 and 48, shaped to follow the curvature of the inside faces of lower edges of the plowshare, are mounted in close contact therewith. Conduits 47 and 48 join conduit 46 near the toe of the plowshare, as shown. By means of this construction sufficient cooling by conduction of the plowshare is provided to maintain an earth and ice coating thereon. Conduits 47 and 48 may be utilized as injection nozzles; or alternatively, trailing injection nozzles may be attached thereto in the manner illustrated in Figures I and II.

The abrasive effects of different soils will, of course, vary greatly, depending upon the composition thereof. It has been determined in field tests, however, that the average life of a sub-surface injection nozzle formed of a section of common galvanized iron pipe, such as is illustrated at 19 of Figure I, when drawn through soil at a rate of approximately 3 miles per hour without maintaining a frozen protective sheathing thereon, is between approximately 5 and 10 hours. The same type of nozzle, when protected with a frozen protective sheathing as taught above, shows no trace of abrasive wear when operated under the identical conditions for many hours, the average life expectancy being about six months of continuous use. Abrasive wear appears to be entirely eliminated by the method disclosed above, the nozzles being replaced only when internal corrosion has made them unfit for further use.

At present all sub-surface ground working tools are formed of expensive, abrasive-resistant tool steels. By operating according to the present invention or simple modifications thereof to suit the particular tool it is desired to protect, any type of sub-surface ground working tool may be formed of common iron and will have a greater life expectancy than the special tool steel equipment considered necessary at present.

It will be found that the amount of refrigerating fluid normally injected will usually be sufficient to form and maintain a frozen protective sheathing on the sub-surface tools under ground working conditions. This is particularly true in the case of ammonia, the minimum quantity normally used for fertilizing purposes (i. e., about thirty pounds per acre) being ample to maintain a satisfactory frozen protective sheathing on the sub-surface equipment when applied to the soil as described above.

I claim as my invention:

1. The method of protecting sub-surface ground working tools against abrasive wear comprising the steps of forming and maintaining a frozen protective sheathing thereon.

2. The method of protecting a sub-surface ground working tool against abrasive wear comprising the steps of passing a refrigerating fluid from a pressure source to an expansion zone in proximity to said tool and expanding said refrigerating fluid within said expansion zone, thereby forming a frozen protective sheathing on said tool.

3. The method according to claim 2 wherein the refrigerating fluid is ammonia.

4. The method according to claim 2 wherein the refrigerating fluid is sulfur dioxide.

5. The method according to claim 2 wherein the refrigerating fluid is hydrogen cyanide.

6. In a method of protecting sub-surface ground-working tools against abrasive wear the steps comprising continuously passing a refrigerating fluid under pressure to expansion zones in proximity to said tools and continuously expanding refrigerating fluid in said expansion zones under conditions whereby a frozen protective sheathing is formed and continuously maintained on said tools under ground working conditions.

7. In a method of protecting a sub-surface ground working tool against abrasive wear the step comprising expanding a refrigerating fluid in an expansion zone in proximity to said tool under conditions whereby a frozen protective sheathing is formed on the exterior surfaces of said tool.

8. In a method of protecting a sub-surface ground-working tool against abrasive wear the steps comprising continuously expanding a refrigerating fluid in an expansion zone in proximity to said tool under conditions whereby a frozen protective sheathing is formed on the exterior surfaces of said tool and thereafter continuously passing said expanded refrigerating fluid from said expansion zone into and under the surface of the ground.

9. In a method of protecting a sub-surface ground working tool from abrasive wear the steps comprising continuously passing refrigerating fluid from a source of refrigerating fluid under pressure to an expansion zone in proximity to said tool, continuously expanding refrigerating fluid in said expansion zone under conditions whereby a frozen protective sheathing is formed and continuously maintained on said tool under ground working conditions and continuously passing expanded refrigerating fluid from said expansion zone into and under the surface of the ground.

10. In a method of protecting a sub-surface ground working tool against abrasive wear the steps comprising withdrawing a refrigerating fluid from a pressurized source, expanding said withdrawn refrigerating fluid and passing said expanded refrigerating fluid through said tool under conditions whereby a frozen protective sheathing is formed and maintained on the exterior surface thereof.

11. In ground working equipment of the class described the combination comprising a portable frame member, a plurality of sub-surface ground working tools mounted on said frame member, a source of refrigerating fluid under pressure carried by said frame member, a manifold mounted on said frame member, conduit means between said source of refrigerating fluid and said manifold, an expansion chamber mounted in close proximity to each of said sub-surface ground working tools, flexible conduit means between said manifold and said expansion chambers, a sub-surface injection nozzle adjacent each of said expansion chambers and flexible conduit means between each of said sub-surface injection nozzles and their adjacent expansion chambers.

FLOYD H. LEAVITT.